July 31, 1962     V. G. BOCKELMANN     3,047,261
PARACHUTE DISREEFING DEVICE
Filed June 10, 1959
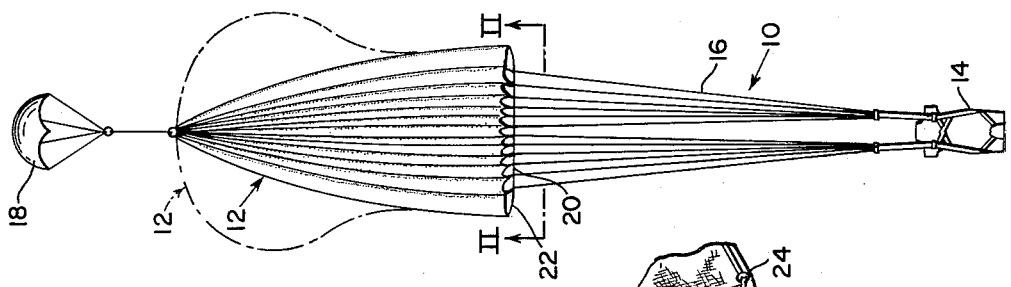
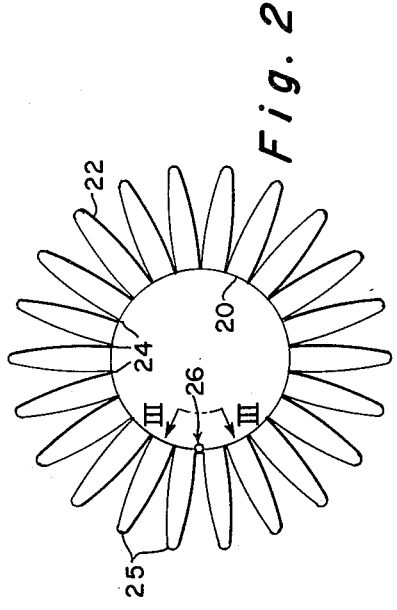
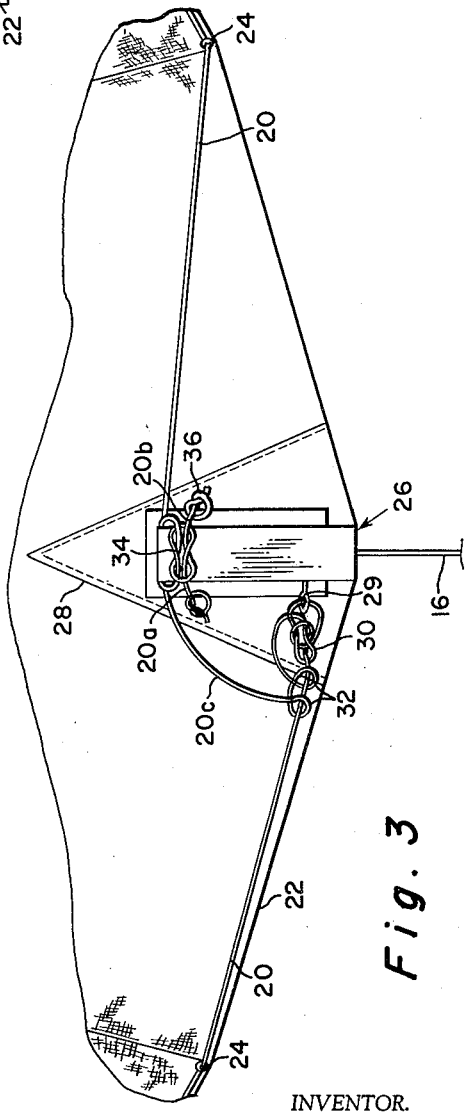
INVENTOR.
VICTOR G. BOCKELMANN
BY
ATTORNEYS

United States Patent Office 3,047,261
Patented July 31, 1962

3,047,261
PARACHUTE DISREEFING DEVICE
Victor G. Bockelmann, El Centro, Calif., assignor to the United States of America as represented by the Secretary of the Navy
Filed June 10, 1959, Ser. No. 819,513
5 Claims. (Cl. 244—150)
(Granted under Title 35, U.S. Code (1952), sec. 266)

The invention described herein may be manufactured and used by or for the Government of the United States of America for governmental purposes without the payment of any royalties thereon or therefor.

This invention relates to reefed-type parachutes, and more particularly to disreefing devices for such parachutes that are armed after the occurrence of the snatch force.

The reefing of parachutes for drops at high altitudes and speeds is a conventional practice well established in the art. Reefing consists of restricting the mouth of the parachute, to a smaller diameter, usually by a reefing line, during the initial descent to limit the amount of air admitted to the canopy until it is safe to fully open the parachute. This action avoids an excessive build-up of pressure within the parachute, compared to the atmospheric pressure outside the canopy, that would otherwise cause canopy blowout and a total destruction of the parachute and the respective load being carried.

An inherent loading characteristic of a parachute occurs when the parachute assembly reaches the full line stretch at which time the maximum force, or so-called snatch force, is applied by the load on the parachute canopy through the shroud lines. As will be later described, this initial tension on the shroud lines is utilized in most prior art parachutes to arm the disreefing device. After the snatch force is initially applied to the shroud lines, the canopy gradually inflates to the maximum diameter reefed condition. Upon a predetermined lapse of time or at a preset altitude, the disreefing device is actuated to release the parachute canopy to a fully inflated condition for the remainder of the descent.

Various types of disreefing devices have been designed to fully open the parachute at a predetermined event. One such device is illustrated in U.S. Patent No. 2,665,863 wherein a disreefing device encircles the shroud lines adjacent the canopy. The device is released by the contact with the ground of a weight on a line suspended from the parachute.

Other disreefing devices rely on reefing lines and reefing line cutters which are armed by the snatch force applied to the shroud lines during the initial drop. Arming of the disreefing device by tension applied to the shroud lines at the point of maximum load on the parachute has caused accidental discharging of the disreefing device and, the resulting destruction of the parachute by premature inflation.

The present invention avoids such a premature operation of the disreefing device by arming the device after the snatch force occurs, and, therefore independently of the snatch force. This result has been achieved by utilizing a reefing line freely passing through rings interspersed along the canopy skirt and connected at its ends to a cutting device, preferably operated by barometric pressure. One end of the reefing line is connected to an arming pin of the cutter so that the reefing line cutter is armed only when the reefing line, as distinguished from a shroud line, is subjected to tension. A predetermined amount of slack can be achieved in the reefing line by the manner of tying the reefing line to the cutter.

A principal object of this invention is to provide a disreefing device for parachutes which cannot be unlocked by the snatch force to which the parachute is subjected in the initial opening, and a correlary object is to provide such a device which will be armed after the initial snatch force is applied to the shroud lines between the load and the canopy.

Another object is to connect the disreefing device to the reefing line to be operated by a predetermined tension applied to the reefing line during descent and upon full reefing.

Further objects are to provide a disreefing device that will be safer and simple in operation, and prevent accidental blowout of the parachute.

Other objects and many of the attendant advantages of this invention will be readily appreciated as the same becomes better understood by reference to the following detailed description when considered in connection with the accompanying drawings wherein:

FIG. 1 is a side elevation view of the parachute during descent at the instant of full line stretch at which time the snatch force is applied to the shroud lines between the load and the parachute canopy, the canopy shape at the time of full reefing shown in phantom lines;

FIG. 2 is a transverse cross-section of the parachute showing the reefing line threaded around the canopy skirt and connected to the disreefing device; and Fig. 3 is enlarged partial elevation of the canopy taken along line III—III of FIG. 2 showing the details of the knots connecting the reefing line to the canopy skirt and the reefing line cutter, the knots being illustrated in a loose condition.

In the drawing where like reference numerals refer to similar parts throughout the drawing, there is shown in FIG. 1 a parachute assembly 10 comprising a canopy 12, a personnel harness 14 representing a load, and a plurality of shroud lines 16 supporting the load to the canopy. Parachute 10 is diagrammatically portrayed during descent at the instant of full line stretch, a position where the snatch force is applied to the shroud lines, that is, the maximum force applied by the load to the canopy. A conventional pilot parachute 18 is attached to the main canopy for stabilization.

Canopy 12 is reefed by a reefing line 20 which encircles the inside periphery of a canopy skirt portion 22 being threaded through reefing rings 24 attached thereto at a plurality equidistant points around the canopy periphery, some twenty being illustrated. The number of reefing points may vary depending on the particular parachute design. Reefing line 20 is materially shorter in length than the periphery of the fully opened parachute skirt, so that securing the ends of the reefing line passing through rings 24 will cause the canopy to form a series of folds 25, the center of the folds being spaced intermittently with rings 24.

The ends of reefing line 20 are connected together at a reefing line cutter 26, such as a barometric reefing line cutter manufactured by the Masters Specialties Company of Los Angeles, California. Cutter 26 can be secured to one of a plurality of conventional reinforcement pocket 28 usually sewn to the parachute at the junction of the canopy gores from which the shroud lines are suspended. Reefing line 20 is loosely threaded through all of the reefing rings, one free end portion 20a of the reefing line passing directly through an opening in the cutter adjacent the cutting mechanism (not shown). Another free end portion 20b of the reefing line is first secured to an arming pin 29 of the cutter by a bowline knot 30 and two half hitch knots 32, the remaining end portion 20c of the reefing line being then threaded through the cutter opening contiguous with, but in an opposite direction to reefing line end portion 20a. It has been found desirable to allow a slack of several inches in reefing line end portion 20c for a purpose to be explained. The respective end portions after passage through the cutter opening are anchored around the cutter with a surgeon's reef knot 34 or a square knot and with overhand knots 36 at the ends to prevent unthreading. All the knots are diagrammatically illustrated in a loose, or nontightened condition.

Arming pin 29 is slidably mounted in the cutter, coaxially with the main portion of the reefing line, so that a predetermined tension applied to the reefing line during reefing will pull and disconnect the arming pin from the cutter. The allowed slack in portion 30c of the reefing line ensures that tension applied in the main portion of the reefing line will first arm the cutter by pulling the pin before the reefing line is tightened to the fully reefed condition.

Operation of the novel reefing mechanism occurs as follows after parachuate 10 and the load 14 is dropped. The load 14 being heavier falls quicker and begins to draw out shroud lines 16, assisted by pilot parachute 18, until the fully stretched condition is reached in FIG. 1 at which time the maximum tension, or snatch force, is applied to shroud lines. At this time, reefing line 20 is not under tension, and, consequently, there is no force tending to release arming pin 29.

After the snatch force is applied, canopy 12 continues to inflate until the fully reefed, phantom-like position illustrated in FIG. 1. During canopy inflation the canopy skirt is forced radially outwardly to the reefed position to where tension is applied on the reefing line. The tension on the reefing line is in a plane transverse to the line of application of the snatch force in the shroud lines. Tension builds up in the reefing line until the force is sufficient to pull arming pin 29 free of, and unlocking, the cutter, absorbing the slack in end portion 30c of the reefing line. When the fully reefed parachute reaches a predetermined altitude for a barometrically operated cutter, the cutting line will be severed at the ends 30a and 30b, and the parachute is free to inflate to the full operating position, not illustrated.

The novel disreefing device ensures that the reefing line cutter remains in a secured unarmed condition when the parachute is subjected to a snatch force, thereby preventing accidental disreefing by, and simultaneously with, the snatch force. Arming occurs only when the parachute is fully reefed at which time tension is applied to the reefing line to unlock the reefing line cutter.

Obviously many modifications and variations of the present invention are possible in the light of the above teachings. It is therefore to be understood that within the scope of the appended claims the invention may be practiced otherwise than as specifically described.

I claim:

1. In combination with a parachute having a canopy with a skirt portion, a plurality of guide means secured around said skirt portion at predetermined spaced intervals, a reefing line having two ends freely threaded through said guide means, the length of said reefing line being less than the peripheral length of the canopy skirt for restricting the mouth of said skirt by folding the periphery thereof when the ends of the reefing line are secured, a cutter to which said ends are connected, said cutter having an opening through with said reefing line passes, said cutter having means for separating said reefing line and disreefing the parachute at the occurrence of a predetermined event, said cutter having means for locking the cutter in a disarmed condition, said locking means being connected to said reefing line and being unlocked by a tension applied to said reefing line to arm said cutter when the parachute is reefed being after the parachute is subjected to a snatch force.

2. The combination of claim 1 wherein one end of said reefing line is attached to the locking means before passage through the cutter, said reefing line having a predetermined amount of slack between the point of attachment to the locking means and the cutter to ensure that the cutter is disarmed prior to full parachute reefing.

3. The combination of claim 2 wherein said locking means is a slidable pin arranged to be substantially coaxially aligned with the reefing line, whereby a predetermined tension on the reefing line will withdraw the pin to unlock and arm the cutter.

4. In combination with a parachute having a canopy with a skirt portion, a plurality of guide means secured around said skirt portion at predetermined spaced intervals, a reefing line having two ends freely threaded through said guide means, the length of said reefing line being less than the length of the skirt periphery for restricting the mouth of said skirt by folding the periphery thereof when the ends of the reefing line are secured, a barometric line cutter having an opening through which both ends of said reefing line are threaded in opposite directions, said ends after passing through said cutter being tied and knotted together, said cutter having means for separating said reefing line and disreefing the parachute at the occurrence of a predetermined altitude, said cutter having a slidably-mounted locking pin securing the cutter in a disarmed position, a portion of the reefing line adjacent one of said ends tied and knotted to said pin, prior to passage through the cutter, the end portion of the reefing line between the pin and the opening in the cutter having a predetermined amount of slack, said pin being coaxially aligned with the main portion of the reefing line to which it is tied so that initial tension on the reefing line will withdraw the pin prior to dissipating the slack in the reefing line.

5. In combination with a parachute having a canopy with a skirt portion, a plurality of guide means secured around said skirt portion at predetermined spaced intervals, a reefing line threaded through said guide means, the length of said reefing line being less than the peripheral length of the canopy skirt for restricting the mouth of said skirt by folding the periphery thereof when the reefing line is secured, a barometrically-operated reefing line cutter having an opening through which said reefing line passes, said cutter having means for separating said reefing line and disreefing the parachute at a predetermined altitude, said cutter having means for locking the cutter in a disarmed condition, said locking means being connected to said reefing line and being unlocked by a tension applied to said reefing line to arm said cutter when the parachute is reefed, whereby the parachute can be disreefed at the predetermined altitude.

References Cited in the file of this patent

UNITED STATES PATENTS

| 1,783,452 | Reed | Dec. 2, 1930 |
| 2,665,863 | Muther | Jan. 12, 1954 |
| 2,732,153 | Frieder et al. | Jan. 24, 1956 |
| 2,742,697 | Gross | Apr. 24, 1956 |
| 2,755,550 | Benjamin | July 24, 1956 |
| 2,942,818 | Stott | June 28, 1960 |